Z. R. LILE & V. H. DAVIDSON.
CORN TOPPING MECHANISM.
APPLICATION FILED NOV. 22, 1911.
1,041,821.
Patented Oct. 22, 1912.
2 SHEETS—SHEET 1.
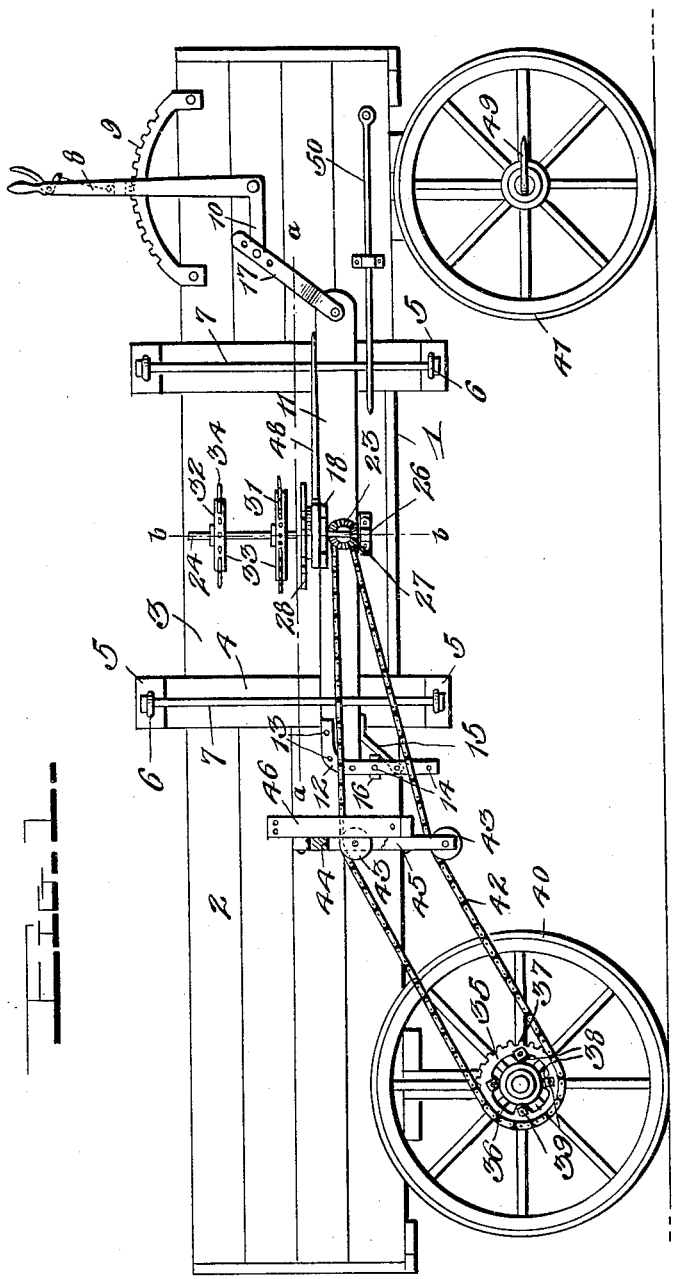
Witnesses
Chas. L. Griesbauer.
A. B. Norton.
Inventors
Z. R. Lile and
V. H. Davidson,
By Watson E. Coleman.
Attorney

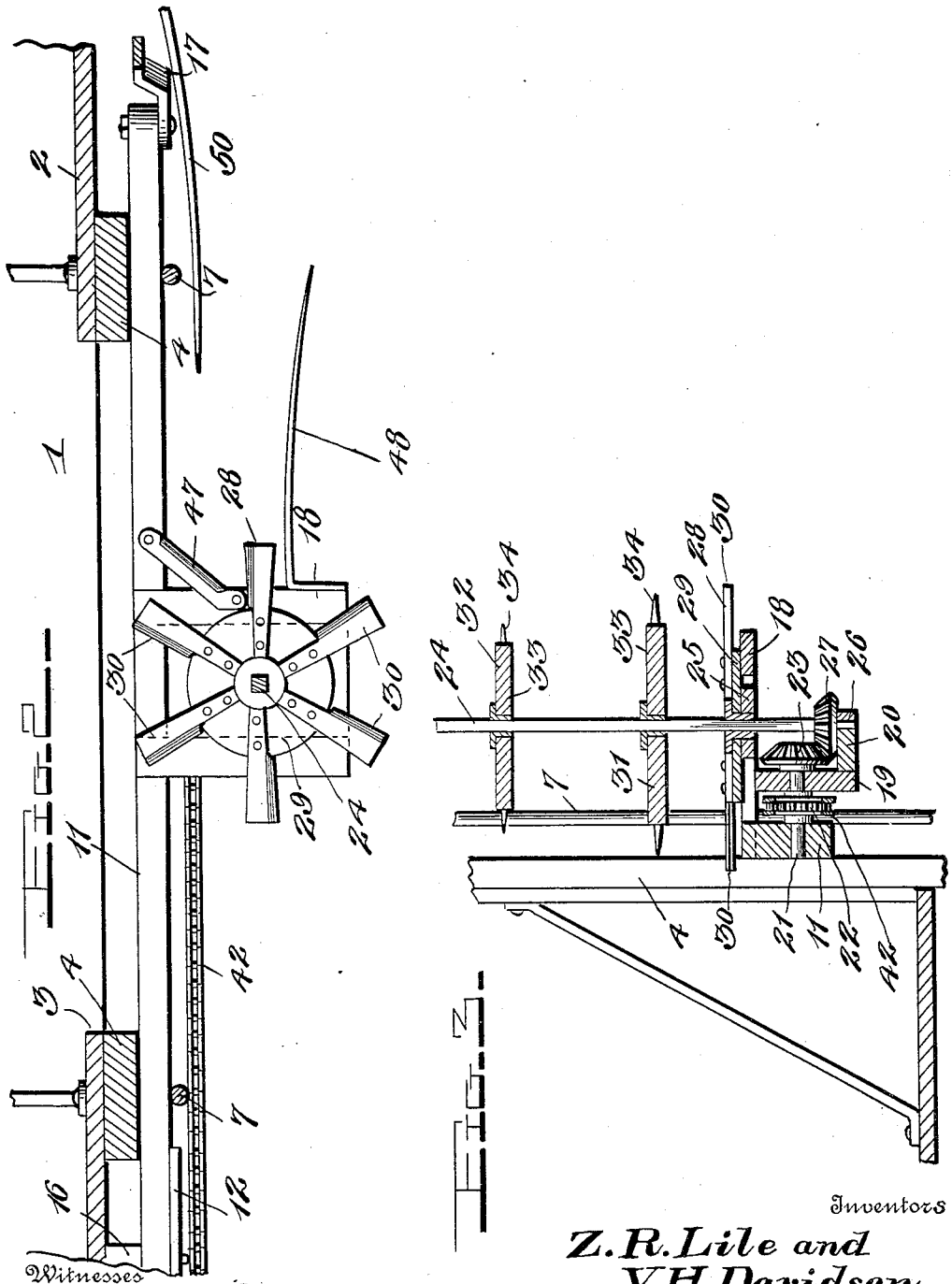

UNITED STATES PATENT OFFICE.

ZENAS R. LILE AND VIRGIL H. DAVIDSON, OF CORBIN, KANSAS.

CORN-TOPPING MECHANISM.

1,041,821.  Specification of Letters Patent.  Patented Oct. 22, 1912.

Application filed November 22, 1911. Serial No. 661,716.

*To all whom it may concern:*

Be it known that we, ZENAS R. LILE and VIRGIL H. DAVIDSON, citizens of the United States, residing at Corbin, in the county of Sumner and State of Kansas, have invented certain new and useful Improvements in Corn-Topping Mechanisms, of which the following is a specification, reference being had to the accompanying drawings.

This invention is an improved machine for topping Kafir corn and other growing crops and is especially adapted for use in connection with and as an attachment to a farm wagon, the object of the invention being to provide a machine of this character which may be readily attached to a farm wagon or removed therefrom, which is extremely simple in construction, can be adjusted vertically as required by the height of the corn or other crop to be topped and which is practical, efficient, and can be operated readily.

The invention consists in the construction, combination and arrangement of devices hereinafter described and claimed.

In the accompanying drawings: Figure 1 is a side elevation of a Kafir corn topping mechanism constructed in accordance with our invention, showing the same in use in connection with and as an attachment to a farm wagon; Fig. 2 is a plan of the same on the line *a—a* of Fig. 1; and Fig. 3 is a vertical sectional view on the plane indicated by the line *b—b* of Fig. 1.

For the purposes of this specification a wagon bed is indicated at 1. This wagon bed has a removable side 2 on which our Kafir corn topping mechanism is mounted and the said removable side, which forms a support for the topping mechanism, is provided with an opening 3 at the sides of which are vertical bars 4. These bars have blocks 5 secured on their outer sides at their upper and lower ends by means of eye bolts 6 and the eye bolts also secure a pair of vertical guide rods 7, which are spaced from the bars 4 by the blocks 5.

Near the front end of the side 2 is a hand lever 8 which may be held in any desired position by a segment 9 and has an arm 10 at its lower end. A supporting bar 11, which is disposed in the spaces between the bars 4 and rods 7, extends transversely across the lower portion of the opening 3 and is adapted for vertical adjustment. At one end of the supporting bar is an angle arm or iron 12 which is secured thereto as at 13, extends downwardly therefrom and is provided with a series of adjusting openings 14. The said angle iron or arm 12 is provided with a brace arm 15 which is secured to the under side of the supporting bar 11. A stud 16 of suitable construction is secured to the side 2 and projects therefrom at a point near the lower end of one of the bars 4 and this stud may be engaged with any one of the openings 14 of the arm 12 so that the end of the supporting bar provided with said arm may be vertically adjusted, as will be understood. The opposite end of the supporting bar 11 is connected by a link 17 to the arm 10 of the lever 8. Hence the said end, also, of the supporting bar may be adjusted. It will be understood that by this means the adjusting bar, which carries the topping mechanism, may be adjusted vertically at will and, if desired, may also be disposed in an inclined position.

At a point on the bar 11 opposite the center of the opening 3 is secured the inner end of a bracket 18. The said bracket projects outwardly from the supporting bar and is of suitable size and shape. A block 19 has its upper end secured to the under side of the bracket 18, at a suitable distance from the bar 11, said block depending from said bracket and to the lower end of the said block is secured a bracket block 20 which projects outwardly therefrom. A short shaft 21 is journaled in bearings in the bar 11 and block 19 and is provided in the space between said bar and block with a sprocket wheel 22, and is provided also, at its outer end, with a beveled gear 23 which is disposed on the outer side of the block 19. A vertical shaft 24 is journaled in a block 25 on the bracket 18 and is also journaled in a bearing in the bracket block 20 as at 26. The said shaft has a beveled gear wheel 27 which engages the gear 23. On the shaft 24 is a cutter 28 which comprises a hub or disk 29 and a series of radial cutter blades 30 which project outwardly therefrom. The shaft 24 also carries a reel 31 which is disposed a short distance above the cutter and another reel 32, which is spaced a suitable distance above the reel 31. Each reel is here shown as comprising a disk 33 and spurs 34 which radiate therefrom. The reel 32 is of less diameter than the reel 31 and is provided with fewer, but with longer, spurs.

We also provide a driving gear 35 which comprises a rim 36, having peripheral spurs 37 and a series of inwardly extending gears 38. Hook bolts 39 which engage some of the spokes of one of the rear wagon wheels 40 also pass through openings in the said lugs 38, and, hence, serve to secure the said driving gear to the said rear wagon wheel for rotation thereby when the wagon is in motion. The front wagon wheels, indicated at 41, are of the usual construction. An endless sprocket chain 42 is driven by the gear 35 and engages the gear 22 on the shaft 21. Hence when the wagon is in motion the shaft 24, which is geared to the shaft 21, as hereinbefore described, is revolved rapidly and as the wagon is driven along side a row of cotton or other grain, said grain is topped by the revolving cutter 28 while the reels 31, 32 engage the tops of the grain and throw them into the wagon body or bed through the opening 3, as will be understood.

The leads of the driving chain 42 operate on peripherally grooved supporting rollers 43 which are mounted in a vertical slot 44 of a bar 45. This bar is secured on the outer side of the side or wall 2 of the wagon bed and is provided with a brace 46.

A fixed blade 47 is secured diagonally on the supporting bar 11 and the bracket 18 and bears against the under side of the revolving cutter 28 and co-acts with the said cutter in cutting the stalks of the corn, as will be understood. A guide arm 48 is secured at its rear end to the bracket 18. This guide arm is curved and extends forwardly and outwardly from the said bracket 18 and serves, as the machine moves along, to draw the stalks of the corn into the path of the cutters and the reels. A fender arm 49 is secured on the spindle of the front wheel 41 and prevents the hub of the wheel from knocking down the corn.

While we have herein shown and described a preferred form of our invention we would have it understood that changes may be made in the form, proportion and construction of the several parts without departing from the spirit of our invention as defined by the appended claims. We would also have it understood that the various parts of the machine may be made of any suitable material.

The topping mechanism may be readily removed from the wagon at any time by merely removing the side 2 and also the gear 35 and the fender arm 49.

We also employ a fender 50 on the side 2 of the wagon to prevent the corn from coming in contact with the parts of the header in front of the revoluble cutter and the fixed blade.

Having thus described our invention we claim:

1. In topping mechanism of the character described, the combination with a wagon box formed with a side opening, of a bar having a vertically adjustable connection at one end with the side of the wagon box at one side of said opening, means supported by the side of the wagon box at the other side of said opening and connected to the other end of the bar for vertically adjusting said last named end higher and lower or on a level with the first named end of the bar and for holding the bar in adjusted positions, a rotary cutter carried by the bar, and means for operating said cutter.

2. In topping mechanism of the class described, the combination with a wagon box formed with a side opening, of a bar provided at one end with an arm formed with a plurality of apertures, a stud projecting from the side of the wagon box at the rear of said opening and adapted for engagement in any of said apertures, a lever carried by the side of the wagon box in front of said opening, a link connection between the forward end of the bar and said lever, a rotary cutter carried by the bar, and means for operating said cutter.

3. A machine of the class described comprising a vehicle having a side provided with an opening, a supporting bar extending across the said opening and provided at one end with means attaching the same to the side for vertical adjustment, guides for the said supporting bar, a lever on said side having an arm, a link connecting said arm to the other end of said supporting bar, a bracket projecting from said supporting bar, a fixed cutter on said bracket and supporting bar, a vertical shaft carried by said bracket, a rotary cutter and rotary reels carried by said shaft, said rotary cutter co-acting with said fixed cutter, a driving gear revolved by a wheel of the vehicle and power transmitting means between said driving gear and the said vertical shaft, to rotate the latter, the rotary cutter and the reel.

4. In topping mechanism of the character described, the combination with a wagon box formed with a side opening; of a supporting bar extending across said opening, the bar being provided at its rear end with a downwardly extending and vertically disposed arm formed with a plurality of apertures, a stud projecting from the side of the wagon box and adapted to enter the apertures of said arm, a link pivotally connected to the other end of the bar, a bell crank lever fulcrumed on the side of the wagon box and having one of its arms connected to said link, a cutter and reel carried by said bar, and means for operating said cutter and reel.

In testimony whereof we hereunto affix our signatures in the presence of two witnesses.

ZENAS R. LILE.
VIRGIL H. DAVIDSON.

Witnesses:
 FLOYD W. BAILEY,
 H. B. MORTON.

Copies of this patent may be obtained for five cents each, by addressing the "Commissioner of Patents, Washington, D. C."